United States Patent
Tavernier (10) Patent No.: US 11,346,424 B2
(45) Date of Patent: May 31, 2022

(54) JUNCTION DEVICE FOR CONVEYOR BELT

(71) Applicant: FP BUSINESS INVEST, Saint-Chamond (FR)

(72) Inventor: Bernard Tavernier, Saint-Chamond (FR)

(73) Assignee: FP BUSINESS INVEST, Saint-Chamond (FR)

( * ) Notice: Subject to any disclaimer, the term of this patent is extended or adjusted under 35 U.S.C. 154(b) by 16 days.

(21) Appl. No.: 17/255,901

(22) PCT Filed: Jun. 25, 2019

(86) PCT No.: PCT/EP2019/066913
§ 371 (c)(1),
(2) Date: Dec. 23, 2020

(87) PCT Pub. No.: WO2020/002378
PCT Pub. Date: Jan. 2, 2020

(65) Prior Publication Data
US 2021/0293302 A1    Sep. 23, 2021

(30) Foreign Application Priority Data

Jun. 26, 2018    (FR) ...................................... 1855731

(51) Int. Cl.
*F16G 3/08*    (2006.01)
*F16G 3/10*    (2006.01)

(52) U.S. Cl.
CPC ................. *F16G 3/08* (2013.01); *F16G 3/10* (2013.01)

(58) Field of Classification Search
CPC .... F16G 3/08; F16G 3/10; F16G 3/09; D03D 5/00; D03D 47/02
(Continued)

(56) References Cited

U.S. PATENT DOCUMENTS 5,542,527 A * 8/1996 Jakob ........................ F16G 3/00
                                                            198/844.2
5,573,470 A * 11/1996 Jakob ........................ F16G 3/00
                                                            198/844.2
(Continued)

FOREIGN PATENT DOCUMENTS

| EP | 1163459 A1 | 12/2001 |
| FR | 2706964 A1 | 12/1994 |
| GB | 2210065 A  | 6/1989  |

OTHER PUBLICATIONS

International Search Report issued in corresponding International Application No. PCT/EP2019/066913, dated Sep. 5, 2019, pp. 1-2, European Patent Office, Rijswijk, Netherlands.
(Continued)

*Primary Examiner* — Mark A Deuble
(74) *Attorney, Agent, or Firm* — Hauptman Ham, LLP (57) ABSTRACT

A junction device for connecting two ends of a longitudinal conveyor belt includes at least two junction plates configured to each cover a separate side of the ends of the conveyor belt so that said conveyor belt is arranged between the two junction plates in an assembled operational position. The junction plates are secured together by attachment means arranged to pass through a junction plate, one of the ends of the conveyor belt and then the other junction plate, respectively. Each of the junction plates is made of a flexible, resilient material and provided with a reinforcement. The reinforcement is formed by at least one textile layer. The reinforcement is delimited longitudinally by transverse edges. The reinforcement extends transversely relative to said conveyor belt in the assembled position. The transverse edges each have an unweaving support to prevent the unweaving of the reinforcement during usage of the junction device.

5 Claims, 4 Drawing Sheets

(58) Field of Classification Search
USPC .................................................. 198/844.2
See application file for complete search history.

(56) References Cited

U.S. PATENT DOCUMENTS

| | | | | |
|---|---|---|---|---|
| 5,620,085 | A * | 4/1997 | Cadou | F16G 3/02 |
| | | | | 198/844.2 |
| 6,601,698 | B2 * | 8/2003 | Jakob | F16G 3/00 |
| | | | | 198/844.2 |
| 6,695,134 | B2 * | 2/2004 | Rubino | F16G 3/02 |
| | | | | 198/844.2 |
| 6,820,309 | B1 * | 11/2004 | Gersbach | F16G 3/08 |
| | | | | 198/844.2 |
| 8,365,906 | B2 * | 2/2013 | Moeschen-Siekmann | |
| | | | | F16G 3/09 |
| | | | | 198/844.2 |
| 2004/0040610 | A1 | 3/2004 | Speich et al. | |

OTHER PUBLICATIONS

Written Opinion issued in corresponding International Application No. PCT/EP2019/066913, dated Sep. 5, 2019, pp. 1-5, European Patent Office, Rijswijk, Netherlands.

* cited by examiner

Fig. 1

Section A-A
Fig. 2

JUNCTION DEVICE FOR CONVEYOR BELT

CROSS REFERENCE TO RELATED APPLICATION

This present application is a national stage filing under 35 U.S.C § 371 of PCT application number PCT/EP2019/066913 filed on Jun. 25, 2019, which is based upon and claims the benefit of priority to French Patent Application No. 1855731 filed on Jun. 26, 2018, in the French Patent Office, which are incorporated herein in their entireties by reference.

The present invention relates to a junction device for a conveyor belt intended to connect the ends of at least one conveyor belt. For simplification purposes, by convention, in the present disclosure the term "conveyor belt" will mean both "conveyor belt" and "belt."

Conveyor belts, also called transport belts, are known which are used to transport, or convey, various materials or various products, such as coal, ores, industrial or agricultural products. These conveyor belts consist of belts made from a reinforced elastomer, or from a reinforced synthetic material, with an appropriate length and width, the ends of which must be connected to one another, before mounting, or after mounting, on support and driving devices comprising return rollers and idler rollers. Often these devices also comprise tensioning members, the purpose of which is to tension the conveyor belt well.

To date, various means have been used to perform this connection of the ends of the conveyor belts.

Originally, and still today, vulcanization is used when the belt is made from a reinforced vulcanizable elastomer. After preparatory work intended to create complementary profiles in each end which bear on one another when said ends are brought closer together, the vulcanization is done with added heat and pressure, as is well known. A variant of vulcanization is cold bonding.

Another known connecting means consists in using generally U-shaped staples, cut from a metal sheet, which staples comprise upper plates and lower plates connected by knuckles, these staples being fixed in two series straddling each of the conveyor belt ends to be connected, such that the knuckles protrude and that those of one series can be interleaved between the knuckles of the other series, a connecting and articulation rod next being passed inside the interleaved knuckles so as to thus connect the two ends while forming a sort of hinge. The known means used to fix the staples on the conveyor belt ends consist of stem attachment means such as clamps, rivets and screws.

In the more recent past, junction devices have been proposed which use flat connecting elements generally made from reinforced elastomer or from reinforced synthetic material, respectively positioned on one side and on the other side of the conveyor belt ends and fixed on said ends which must be connected. Examples of such junction devices are given in patents EP-0827575-B1 and EP-1163459-B1.

These devices comprise an upper junction plate and a lower junction plate, which are optionally connected by a central part. These lower and upper junction plates have a separation which is suitable for engaging the respective end of a conveyor belt, causing it to approximately abut against the central part, or in the case where the junction device does not have a central part, against a spacer provided to this end during mounting, then removed later.

In other words, these junction devices comprise two pairs of attachment flanges facing one another, the ends of the conveyor belt respectively being introduced between two flanges of a same pair.

The lower and upper parts forming a junction plate are generally fixed on the ends of the conveyor belt using rivets, nails, clamps, screw-nut systems, or by cold bonding or flat vulcanization of the flanges against the flat outer surfaces of the conveyor belt engaged between the flanges.

The junction devices are generally made from a flexible and resilient material, for example vulcanized rubber, or from a synthetic material, such as polyurethane, in which a reinforcement, generally textile, is embedded which has an extensibility in the longitudinal direction.

By convention and for the convenience and clarity of the description throughout this disclosure, the longitudinal direction is the longitudinal direction of the conveyor belt, and also applies to the coupling device considered as it must be mounted on the conveyor belt. The transverse direction is the direction perpendicular to the longitudinal direction thus defined, irrespective of the dimensions of the coupling device considered alone.

The extensibility of the reinforcements of this type of coupling device in the longitudinal direction aims to allow the coupling devices mounted on the conveyor belts to repeatedly cross the curved parts of the path of the conveyor belts without wear or excessive fatigue that may cause rapid deterioration, namely to bypass the drive rollers, the return rollers and the tensioning rollers.

Indeed, during this operation, the upper part of the junction devices experiences a tractive force while their lower part (that is to say, the part oriented toward the outer surface of the rollers) experiences a compressive force due to the difference in the path of these parts, these paths being directly proportional to the curve radius, which varies due to the thickness of the coupling devices.

Since the stresses are very different between the lower and upper parts, and in order to further improve the wear resistance of these coupling devices, the Applicant has improved its product in the past so as to give the upper part a greater extensibility than the lower part.

In this type of conveyor belt junction, the central part next evolved so as to be separated from the lower and upper plates in order to leave room for the use of independent spacers that are used during mounting, against which spacers the first end of the conveyor belt abuts, which is placed in the junction between the lower and upper plates, then these spacers are removed before the second end of the conveyor belt is placed.

Indeed, the junction devices were made by molding or by injection and had an H-shaped structure, the lower and upper plates and the central part of which were formed in a single piece. This required as many molds as there were conveyor belt thicknesses found in the field in order to produce them, and as a result these junction devices had to be manufactured in very small series, which increased the cost for manufacturing, storage and distribution.

This issue, namely the multiplicity of molds and molded products meant to address the varied conveyor belt thicknesses, was in particular resolved by producing, as described above, the junction devices in three separate parts: one part constituting left and right upper flanges forming a single piece, one part constituting left and right lower flanges forming a single piece, and an intermediate part, corresponding to the median bar of the H-shaped profile, this intermediate part forming a spacer.

In such a configuration, it becomes possible to manufacture the two lower and upper plates alone and each one is configured so as to be adapted to the forces that they experience (compression/traction forces) and the associated stresses.

For example, the lower plate is arranged to undergo the passage over the drive rollers, the return rollers and the tensioning rollers without damage, driving or returning the conveyor belt at the ends of which the junction device in question is mounted, the lower plate coming directly into contact with these drive members of the belt.

The upper plate is in turn directly in contact with the various materials or various products transported on the conveyor belt. Furthermore, the upper plate is also generally swept by scrapers.

More recently, the Applicant has developed this product to obtain a junction device whereof the two lower and upper junction plates are similar, or even identical, such that it becomes possible to manufacture a single type of junction plate and no longer two different junction plates.

Indeed, the junction plates are generally cut into a continuous belt or belt portion of several successive junction plates. According to this development, it is then possible to manufacture a lower junction plate and a corresponding upper junction plate from the same belt or belt portion of junction plates.

It results from the application of such a solution that the extensibilities of the reinforcements integrated into the junction plates are identical, whether it involves the lower or upper junction plate, since they are formed from the same manufactured belt or belt portion.

In this case, and contrary to the prejudices of a skilled person, it could be expected that using an identical reinforcement between the two lower and upper junction plates constitutes a development which goes against that seeking to give the upper part a greater extensibility than that of the lower part.

On the contrary, the control of the elasticity of the reinforcements is such that by using a reinforcement with a well determined elasticity, it is possible to manufacture junction plates responding to the problems of the prior art, that is to say, by guaranteeing its wear resistance, even though they will be used both in the lower junction plate and in the upper junction plate.

Advantageously in this case, the reinforcement (generally of the textile type) is configured so as to have an extensibility of between 10% and 25%, preferably between 15% and 20%. The extensible nature refers to the elongation capacity of the reinforcement, that is to say, an extensibility between 10 and 25% means that it is configured to withstand an elongation of at least 10% and at most 25%, without breaking or being damaged.

This extensibility of the reinforcement, that is to say, this longitudinal resilient elongation, also determines the extensibility of the junction plate itself, given that the reinforcement has a lower extensibility than that of the flexible and resilient material in which it is embedded (vulcanized rubber, synthetic material such as polyurethane, etc.).

Such an extensibility in the longitudinal direction ensures a good compromise between resistance to stresses experienced both by the lower junction plate and by the upper junction plate.

In any case, extensibility has become a predominant characteristic in the design of such a junction plate in order to obtain a junction device which is sufficiently flexible and resilient to undergo the passage over drive rollers and over return rollers without damage while having a tensile strength making it able to withstand all of the forces that it undergoes without damage.

These characteristics of extensibility and of resistance to such forces by the junction plate are imparted both by the flexible and resilient material (vulcanized rubber, synthetic material such as polyurethane) forming the junction plate and by the reinforcement which is integrated therein, offering both extensibility in the longitudinal direction and strength suitable for withstanding the greatest tensile forces experienced by the conveyor belt.

Conventionally, these reinforcements, which are generally woven, are cut into rolls of fabric intended to form said reinforcements. Such an operation is relatively inexpensive, and to date has made it possible to obtain good results in terms of strength.

With the help of experience in the field, it has been observed that such a reinforcement, when it is stressed significantly and repeatedly, in particular by the tensile forces that the means for fixing the junction plates with the ends of the conveyor belt apply on the weave of the reinforcement, could cause said reinforcement to deform locally and to relax.

These deformations are located at each of the attachment means and are oriented globally in the direction of the traction exerted by the conveyor belt on the attachment means, then retransmitted by the attachment means toward the junction plates, in particular toward the reinforcements, resulting in a movement of the textile fibers making them locally looser and for example able to cause a widening of the stitches of the textile reinforcement.

When these attachment means are located on the border of the reinforcement, therefore on the border of the corresponding junction plate, the widening of these stitches can cause an unweaving of the reinforcement in question during the use of the junction device, which is detrimental to its strength. The term "unweaving" refers to the disentanglement of the fibers making up the stitches of the textile forming the reinforcement generally, whether it indifferently involves a woven or knitted textile.

One possible solution would be to modify the textile reinforcement such that the weaving is denser and thus stronger. Such a solution is practical to implement, but has its limitations given that it is detrimental to the desired extensibility of the junction plate. Indeed, a higher density of the fabric, in practice a larger number of threads per surface unit, causes a greater rigidity of the reinforcement and therefore of the junction plate.

Another solution would be to design a reinforcement having a variable density weave based on the location of the attachment means relative to the junction device. However, such a solution involves a time-consuming and difficult production, which proves particularly costly to implement.

The object of the present invention is to propose a solution which corresponds to a development of this type of existing junctions and which makes it possible to improve the quality and the strength of this junction device while allowing an improved extensibility, and more generally while guaranteeing the quality, the effectiveness and the durability of the junction device.

To this end, the invention relates to a junction device for a conveyor belt, intended for connecting two ends of at least one longitudinal conveyor belt, the junction device comprising at least two junction plates configured to each cover a separate side of the ends of the conveyor belt so that said conveyor belt is arranged between the two junction plates in an assembled operational position, the junction plates being secured together by attachment means arranged to pass through a junction plate, one of the ends of the conveyor belt and then the other junction plate, respectively, each of the junction plates being made of a flexible, resilient material and provided with a reinforcement, said reinforcement being formed by at least one textile layer, the junction device being characterized in that said reinforcement is delimited longitudinally by edges, the reinforcement extending transversely relative to said conveyor belt in the assembled position, said transverse edges each having an unweaving support to prevent the unweaving of the reinforcement during the use of the junction device.

It is recalled that in the present disclosure, the longitudinal axis corresponds to the longitudinal direction of the conveyor belt, and also applies to the coupling device considered as it must be mounted on the conveyor belt, the transverse axis being the direction perpendicular to the longitudinal direction thus defined, irrespective of the dimensions of the coupling device considered alone.

The transverse edges of the reinforcement thus designate the edges passing through the conveyor belt over its width, even when it is not necessarily perpendicular to said associated conveyor belt.

Owing to these features, the reinforcement forms a belt, or ribbon, which is embedded in the flexible and resilient material of the associated junction plate and whose edges subject to the main tensile forces are thus reinforced, making it possible to avoid any risk of unweaving.

In general, and to date, the transverse row of the attachment means along the outer border, that is to say in the immediate vicinity of the transverse edge, on the two longitudinally opposite ends of the junction, essentially served to keep the edge of the junction pressed on the conveyor belt.

With such a reinforcement in belt form and reinforced along its transverse edges, this makes it possible to avoid unweaving when a force occurs perpendicular to the warp thread, which provides an undeniable additional advantage.

During use of the conveyor belt provided with a junction device of this type, the junction is stressed primarily by a tensile force that occurs in the weft direction of the junction. The latter not being very large in the context of such an application, it is necessary to have a sufficient number of warp threads interwoven with the weft threads behind each row of holes: such weaving of the reinforcement ensures blocking of the threads and offers a certain strength which, multiplied by the number of attachment means, imparts a certain strength to the junction and avoids premature combing of the reinforcement located on this edge.

At the transverse edge of the reinforcement of the junction, it is not possible to have a large enough width of fabric to reproduce the same effect and thus to divide the tensile force by the number of rows.

With an unweaving support according to the invention located on the border, along the transverse edge of the reinforcement, this phenomenon is reduced and a more homogeneous distribution of the tensile force has been observed along all of the lines of the attachment means.

Advantageously, the unweaving support is a woven support. Such a support offers good strength adapted to the forces in the context of a use for the conveyor belt junction.

Alternatively or even in addition, the unweaving support comprises a bonded and/or welded support and/or a seam extending along the transverse edge of the reinforcement.

According to one advantageous technical configuration, the reinforcement comprises weft threads and warp threads, the woven unweaving support being formed from weft and/or warp threads of the reinforcement.

For example, the unweaving support preventing the unweaving of the reinforcement is formed by the return of a weft thread on either side of the warp threads of the reinforcement, the return of the weft thread surrounding the warp thread of the associated transverse edge. In other words and in this configuration, the filling is alternatively inserted on each side of the ribbon formed by the reinforcement, the weave being done by the interlacing of the warp threads and the weft threads.

"Filling" refers to all of the threads that pass through the fabric of the reinforcement in the direction of the width as it is produced. In the present case, the reinforcement is manufactured in ribbon form intended to be positioned, once embedded in the junction plate, transversely relative to the conveyor belt.

The "warp" in turn refers to all of the threads running in the length direction of the fabric as it is produced, parallel to the selvage, in particular to the transverse edge of the reinforcement, and which are interlaced with the weft threads to form the reinforcement.

Such an unweaving support requires producing the reinforcement in ribbon form for example using a rapier loom. Such a solution is admittedly more expensive than manufacturing using a needle loom, because it works more slowly, but the reinforcement thus obtained with such an unweaving support offers a suitable strength and good flexibility for the application to conveyor belt junctions.

To prevent the weaving from being too mobile in light of the forces experienced by the reinforcement during use, it is advantageous to densify the reinforcement by increasing the number of warp threads and of weft threads per surface unit. Indeed, such a densification of the weaving of the reinforcement limits the dispersion of the stitches during use and allows improved strength. In such a context, the reinforcement is preferably configured such that its density, that is to say its number of warp and weft threads per surface unit, is high enough to withstand the tensile forces, but low enough to have a flexibility which is suitable for its use at conveyor belt junctions.

Another advantage of such an unweaving support is that it does not cause an overthickness of the reinforcement, locally at its transverse edge along which the support extends.

In another configuration, the unweaving support is formed by the filling connected to itself.

Such an unweaving support can for example be obtained during the manufacture of the reinforcement by using a needle weaving loom.

According to another advantageous feature, the woven unweaving support is woven from at least one inlaid thread.

For example in this case, the unweaving support is formed by the inlaid thread binding the filling along the transverse edge.

Such an unweaving support can for example be obtained during the manufacture of the reinforcement by using a needle weaving loom.

Alternatively, the unweaving support can be formed by warp threads interlaced with the inlaid thread connected to the weft thread. Although such an embodiment is relatively complex to implement, it has a strength which is adapted to the tensile forces.

In one advantageous technical configuration, the weft thread and the inlaid thread are stitched together to form the unweaving support.

Such an embodiment allows an optimized unstitchability for applications where the presence of an overthickness at the selvage is not important.

In one advantageous technical configuration, in particular if it is desired to keep a regular thickness while avoiding the presence of an overthickness at the selvedge while ensuring an improved unstitchability, the unweaving support comprises an inlaid thread with which the weft threads are connected by stitching and the stitch of which is also blocked by an additional blocking thread.

This blocking thread further ensures additional security by overcoming any breaking of the inlaid thread, thus making it possible, even if the inlaid thread breaks, to prevent the reinforcement from unweaving or unstitching.

The inlaid thread and the catch thread therefore represent contribute to high strength despite a relatively small size. In proportion, the inlaid thread and the blocking thread represent less than 0.5% of a reinforcement, and generally represent between 0.1 and 0.5%. This ratio evolves as a function of the size of the reinforcement between its transverse edges, given that the support does not vary as a function of this size. As a result, the wider the reinforcement is, considered between its two transverse edges, the smaller this ratio will be.

According to one embodiment, the inlaid thread and/or the catch thread are formed with a base of synthetic fibers, for example with a base of polymer(s) such as polyester or polyamide. Of course, other materials can be used in such an application which are flexible enough to be woven and resilient enough for such an application. Examples include Kevlar, Vectran Preferably, the inlaid thread and/or the catch thread is (are) textured, which makes it possible to further improve the strength of the unweaving support, especially in a use such that the reinforcement is embedded in a flexible and resilient material such as vulcanized rubber.

Such an inlaid thread is particularly simple to implement in the manufacture of the reinforcement. However, it goes against the accepted ideas that such an inlaid thread effectively participate in retaining warp threads and preventing unweaving of the reinforcement in light of the considerable forces experienced by the textile in this type of application.

Lastly, the Applicant has noted that such an unweaving support, in particular provided with an inlaid thread, and especially when it is completed with a blocking thread, not only makes it possible to effectively limit unweaving and premature combing of the reinforcement located on this edge, but also, and indirectly by successive effect on the adjacent warp threads, limits this premature combing affected each of the attachment means which pass through the reinforcement, even when the forces applied to the reinforcement in the context of such an application of a conveyor belt junction are considerable.

Other features and advantages of the invention will emerge from reading the following description, provided solely as an example, in reference to the appended figures, which illustrate.

In all of these figures, identical or similar references designate identical or similar members or sets of members.

Additionally, the terms "upper," "lower," "vertical" and their derivatives refer to the position or to the orientation of an element or of a component, this position or this orientation being considered when the junction plates are in the usage configuration and extend in a horizontal plane.

Figure 1:
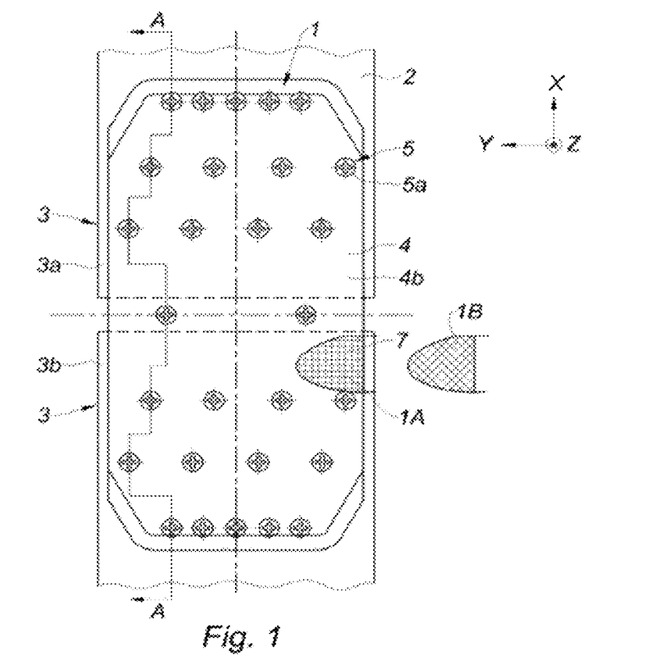
FIG. 1, a planar view of a junction device according to one embodiment, seen from above.

FIG. 1, which is a planar top view of a junction device 1, shows an upper junction plate 4 of a junction device 1.

Figure 2:
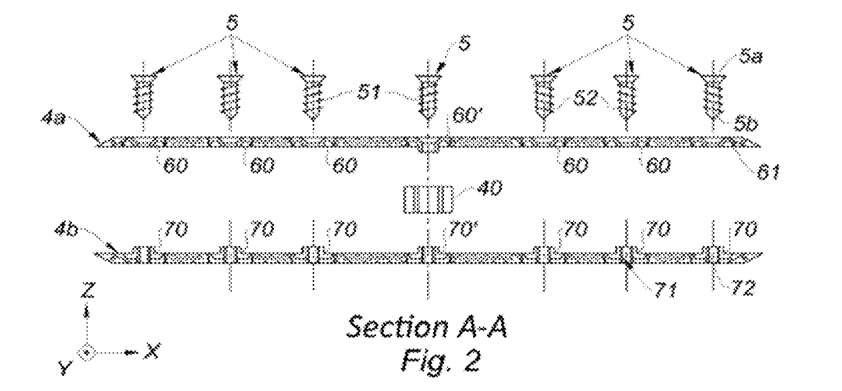
FIG. 2, a longitudinal sectional view along section A-A of FIG. 1 of a junction device, showing the various component elements thereof in exploded view.

The junction device 1 comprises a first lower junction plate 4a visible in FIG. 2 for example, and a second upper junction plate 4b.

These junction plates 4a, 4b are made from a flexible and resilient material 6, for example from vulcanized rubber, or from a synthetic material such as polyurethane, and they comprise an incorporated reinforcement 7, which is generally of the textile type.

The cutaway views 1A and 1B show two types of reinforcements 7 of the textile type, which are woven and comprise weft threads 10 and warp threads 11: in the reinforcement 1A, the fabric is positioned such that its weft threads 10, or its warp threads 11, are oriented at least approximately in the longitudinal direction X of the junction device 1.

It will be recalled that by convention, the longitudinal direction X of the junction device 1 corresponds, in the present disclosure, to the longitudinal direction X of the conveyor belt 2, the junction device 1 being mounted on the ends 3 of the conveyor belt 2 that it connects.

The transverse direction Y of the junction device 1 is, according to the same convention, the direction perpendicular to the longitudinal direction X. This convention is applied irrespective of the actual dimensions of the junction device 1 in these two directions.

Figure 4:
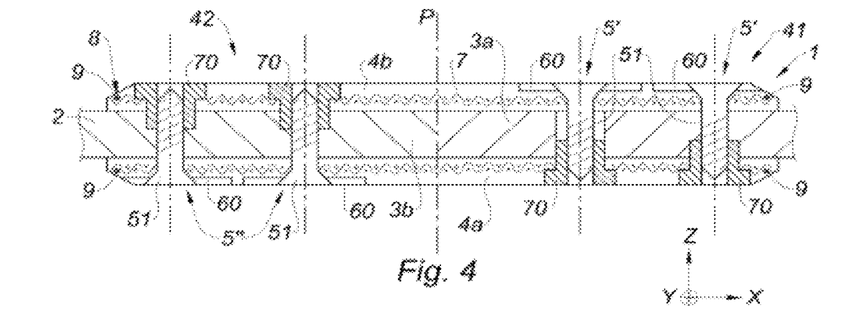
FIG. 4, a longitudinal sectional view, which illustrates a junction device according to one embodiment.

The junction plates 4a, 4b are configured each to cover a separate side of the ends 3 of the conveyor belt 2 such that the conveyor belt 2 is interposed vertically between the two junction plates 4a, 4b (as can be seen for example in FIG. 4).

This FIG. 1 also shows heads 5a of the screws 5 which constitute an example of attachment or assembly means 5 of the junction device 1 to the conveyor belt 2.

The junction device of FIG. 1 is made up of three elements: an element forming the upper junction plate 4b, an intermediate element 40 located below the median part of the junction plate 4 which is not visible in FIG. 1 except by the two dotted lines located on either side of the two median screws 5 delimiting, below the upper junction plate 4, the edges of the ends of the conveyor belt 2 to be connected, and an element forming the lower junction plate 4a, not visible in FIG. 1, which is located below the intermediate element 40 and below the element forming the upper junction plate 4b.

The exploded section of FIG. 2 successively shows:
assembly screws 51 forming attachment means 5,
the upper junction plate 4b,
inserts 60 incorporated into the upper junction plate 4,
the intermediate element 40 forming a spacer and including an incorporated through bushing, positioned vertically along a vertical axis Z,
the lower junction plate 4a comprising tapped inserts 70.

The inserts 60 arranged to receive the screw 51 heads 5a generally assume the form of pierced washers 61 comprising a recess able to house the heads 5a of the screws 5 intended to enter the hole of the pierced washers. The central insert 60' generally looks like the inserts 60, but it comprises a central tubular part, the inner cylindrical surface of which is able to allow the passage, with very little play, of the corresponding screw 5, this screw therefore not screwing into the insert 60'. The central tubular part of the insert 60' protrudes from the lower surface of the upper junction plate 4.

The inserts 70 each comprise a central tubular part, the inner cylindrical surface of which has an internal thread and is able to receive a screw 51 which is screwed into the internal thread, said central tubular parts protruding from the upper surface of the lower junction plate 4a of the junction device 1. The median inserts 70' of the lower plate look like the inserts 70.

As mentioned in the preamble, the Applicant has recently developed this type of product described above to obtain a junction device whereof the two lower and upper junction plates are similar, or even identical, such that it becomes possible to manufacture a single type of junction plate and no longer two different junction plates.

Figure 3:
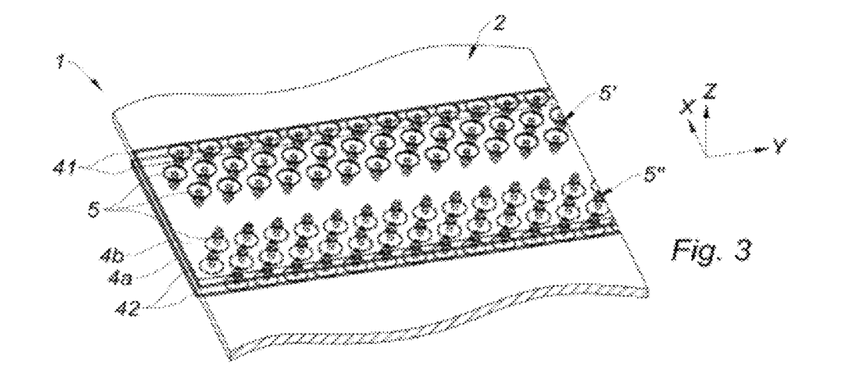
FIG. 3, a perspective overview which illustrates a junction device according to one embodiment of the invention which connects the two ends of a conveyor belt.

An example junction device 1 of this type is illustrated in FIG. 3.

The junction device 1 illustrated in this FIG. 3 comprises a first lower junction plate 4a, and a second upper junction plate 4b.

The junction plates 4a, 4b are configured each to cover a separate side of the ends 3 of the conveyor belt 2 such that the conveyor belt 2 is interposed vertically between the two junction plates 4a, 4b.

The junction plates 4a, 4b form a first pair of flanges 41 which pinch a first end 3a of the conveyor belt 2 and a second pair of flanges 42 which pinch a second end 3b of the conveyor belt 2.

Here, the attachment means are distributed such that they attach a first pair of flanges 41 in one direction and attach the second pair of flanges 42 in the other direction.

The junction plates 4 are generally cut into a continuous belt or belt portion of several successive junction plates. According to this development, it is then possible to manufacture a lower junction plate and a corresponding upper junction plate from the same belt or belt portion of junction plates.

FIG. 4 a longitudinal sectional view, which illustrates a junction device 1 according to an embodiment similar to that of FIG. 3. It differs significantly from this embodiment in that the attachment means 5 extend in two rows, instead of three rows, extending transversely relative to the conveyor belt 2.

More specifically, the first pair of flanges 41 and the second pair of flanges 42 are arranged on either side of a junction plane P which extends perpendicular to the junction plates 4a, 4b, that is to say, in a vertical and transverse plane relative to the conveyor belt according to the example described here.

The junction plane P extends transversely to the center of the assembly formed by the lower junction plate 4a and the upper junction plate 4b.

Furthermore, the junction device 1 comprises a first series of attachment means 5' which are provided to attach the first pair of flanges 41 on the first end 3a of the conveyor belt 2 and a second series of attachment means 5" which are provided to attach the second pair of flanges 42 on the second end 3b of the conveyor belt 2.

The first series and the second series of attachment means 5', 5" each comprise two rows (three in FIG. 3) of attachment means 5, each row comprising a plurality of attachment means 5 which are aligned transversely and evenly spaced apart. Of course, this number of rows may vary.

Figure 5:
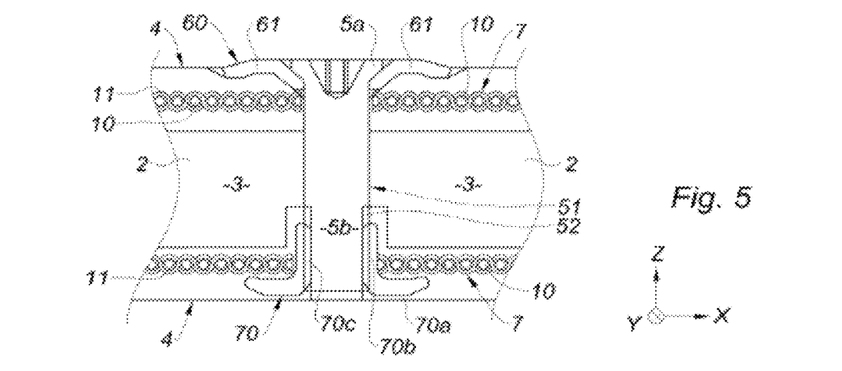
FIG. 5, a sectional view of an attachment means according to one embodiment.

FIG. 5 is a sectional view along a vertical plane of one example of attachment means 5, which are illustrated more schematically in FIG. 4.

These attachment means 5 comprise:
- a connecting element 51 which connects a first attachment element 60 with a second attachment element 70, through the conveyor belt 2, this connecting element being made up of a screw 51 which extends vertically from a head 5a to a body forming an anchoring segment 5b provided with a thread 52.
- the first attachment element 60 arranged to receive the screw 51 head 5a and assuming the form of a washer pierced with a hole for the passage of the connecting element 51 and comprising a seat around this orifice forming a recess which houses the head 5a of the associated screw 51;
- the second attachment element 70 assuming the form of a bushing which is at least partially embedded in the junction plate 4, and comprising an annular collar 70a which protrudes radially relative to the body 70b of the bushing 70 in order to ensure axial anchoring thereof in the material of the junction plate in which it is embedded;

The attachment means 5' of the first series each comprise a first attachment element 60, a second attachment element 70 and a vertical connecting element 51 which connects the first attachment element 60 on the second attachment element 70, through the conveyor belt 2.

Furthermore, the second attachment element 70 comprises a tubular part 70b which delimits a vertical hole 70c with an internal thread and which protrudes vertically from the face of the first junction plate 4 oriented toward the end of the conveyor belt 2 between the two junction plates 4a, 4b in the assembly position. This vertical protrusion is also covered with the vulcanized material forming the junction plate such that each tubular part 40 which protrudes vertically from this face is covered with vulcanized rubber and therefore embedded in the associated junction plate.

The internally threaded hole 70c cooperates with the anchoring segment 5b of the connecting element 51.

Thus, the attachment means 5' of the first series make it possible to clamp the first pair of flanges 41 on the first end 3a of the conveyor belt 2.

Likewise, the attachment means 5" of the second series and which make it possible to clamp the second pair of flanges 42 on the second end 3b of the conveyor belt 2 are identical, but their layout is reversed.

Indeed, in reference to FIG. 4, the first attachment element 60 of each attachment means 5' of the first series is mounted on the upper junction plate 4b and the second attachment element 70 is mounted on the lower junction plate 4a.

The lower junction plate 4a and the upper junction plate 4b are identical, and they are angularly offset by a half-revolution about a vertical axis.

Due to this inversion of the attachment means 5, is particularly advantageous given that this greatly simplifies the mounting of the junction plate by an operator, since by attaching the junction plate to an end of the conveyor belt, the attachment means 5, in particular the connecting elements 51, have a similar orientation for the same end of the conveyor belt and the operator is not required to change orientation for the placement of these connecting elements on this same end. Indeed, the vertical alignment of the first and second attachment elements 60, 70 determines the orientation of the connecting means 51, in particular of the screws which extend vertically from the head 5*a* to the body forming the internally threaded anchoring segment 5*b*.

It will further be noted that the first and second series 5', 5" of attachment means 5 are longitudinally spaced apart from one another by a median zone substantially perpendicular to the junction plane P which is free of attachment means 5, that is to say, in this zone, the junction device 1 does not comprise attachment means 5. This improves the elasticity of the junction device 1 in this location and improves its mechanical strength. Indeed, a row of attachment devices 5 in the center of the junction device 1 could encourage break initiation to a lesser extent.

Further, the junction device 1 illustrated in FIGS. 3 and 4 ensures the attachment of both ends of the conveyor belt are in contact against one another.

For the installation of such a junction device, spacers are used (not illustrated in these FIGS. 3 and 4) during mounting, against which the first of the ends of the conveyor belt abuts which is placed in the junction, between the lower and upper plates, then these spacers are removed before the placement of the second of the ends of the conveyor belt.

These FIGS. 4 and 5 also illustrate a woven reinforcement 7 comprising weft 10 and warp threads interwoven together, said reinforcement 7 being delimited, longitudinally relative to the conveyor belt 2, by transverse edges 8.

It should be noted in these figures that the reinforcement 7, and in particular the weft 10 and warp 11 threads, are not shown to scale relative to the junction plate 4. Furthermore, the illustration of the reinforcement 7 is purely schematic; it is clearly understood, for example, that the reinforcement 7 is not sectioned perpendicular to the attachment means 5, as the drawing may suggest, but that the stitching of the reinforcement is of course continuous.

Irrespective of the embodiment which is implemented, the junction plates have a predetermined extensibility which must be flexible and resilient enough to undergo the passage over the drive rollers and the return rollers without damage all but which must also be rigid enough to withstand all of the forces that it experiences.

This extensibility in particular depends on the reinforcement 7 embedded in the material 6 forming a coating of said reinforcement, this material being relatively flexible and resilient, such that the resistance to the tensile forces during use which are applied by the conveyor belt 2 on the attachment means are borne by the reinforcement 7. In particular, these forces are distributed and located on each of the attachment means 5 of the junction device.

However, these relatively significant and repeated tensile forces can cause, at the attachment means 5 located on the border of the reinforcement 7, and therefore on the border of the corresponding junction plate 4, the widening of these stitches, and therefore an unweaving of the reinforcement 7 which can be detrimental to its integrity and strength.

In order to guarantee the good structural strength of the junction device, and in particular of the reinforcement 7, said reinforcement 7 has, at its transverse edges 8 relative to the conveyor belt 2, an unweaving support 9 so as to prevent the unweaving of the reinforcement 7 during the use of the junction device 1. The two transverse edges 8 of the reinforcement 7 are, in these figures, substantially parallel to one another and pass through the width of the conveyor belt in the usage position.

Such a reinforcement 7 offers a definite advantage in that it prevents the unweaving of the reinforcement 7 which is subject to the tensile forces.

Furthermore, the advantage of such a configuration does not stop at this advantage. It has in fact been observed that with an unweaving support 9 according to the invention located on the border, along the transverse edge 8 of the reinforcement 7, this causes a more homogeneous distribution of the tensile force over all of the lines of the attachment means.

FIGS. 6 to 12 provide a more detailed illustration of various embodiments of unweaving supports according to the invention.

Figures 6, 7, 8, 9:
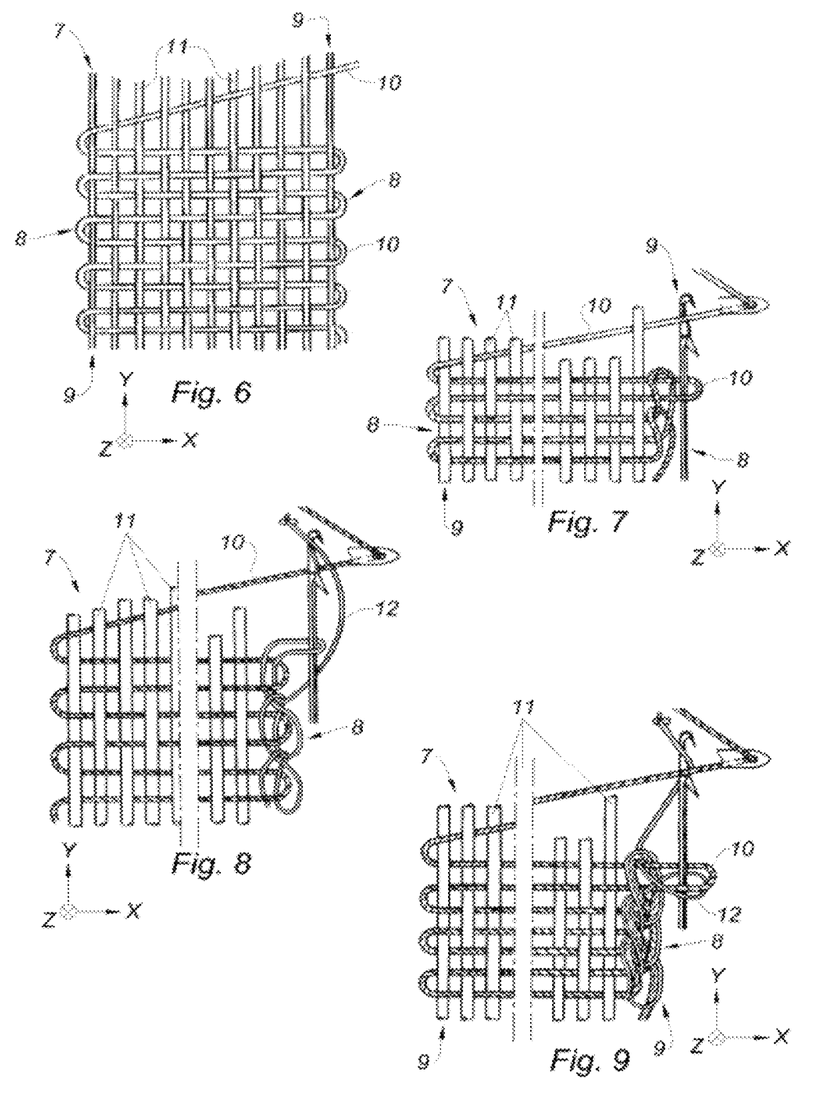
FIGS. 6 to 12, diagrams of unweaving supports of a reinforcement according to various embodiments.

FIG. 6 illustrates a textile reinforcement having interwoven warp threads 11 and weft threads 10. The reinforcement formed here, that is to say, the interweaving mode of the warp threads 11 and weft threads 10, is a 1:1 plain weave, that is to say, the weft thread 10 passes alternately over, then under a warp thread 11, and vice versa.

The reinforcement 7 assumes the form of a belt or ribbon whereof the lateral edges form the transverse edges 8 which extend transversely relative to the conveyor belt 2 when the junction device 1 is in the assembled position.

The reinforcement has an unweaving support 9 on these lateral edges, which support is formed from weft threads 10 of the reinforcement 7. In particular, the unweaving support 9 is formed by the return of a weft thread 10 on either side of the warp threads 11 of the reinforcement 7, the return of the weft thread 10 surrounding the warp thread 11 of the associated transverse edge 8.

Such a reinforcement in belt or ribbon form can for example be obtained with a rapier loom. In other words, when manufacturing such a reinforcement, a system for inserting filling via an element transporting a small quantity of weft thread stored on a spool from one end to the other of the fabric being formed through the shed, the shed designating the space resulting from the separation of the warp threads in two during manufacturing to allow the insertion of said weft thread being woven between the two plies thus formed.

This type of support is advantageous in that the fibers are continuous all along the reinforcement ribbon and their integrity is preserved. The reinforcement 7 obtained with such an unweaving support 9 thus offers suitable strength and good flexibility for application to the conveyor belt junctions 2.

FIG. 7 illustrates a textile reinforcement having an interweaving of warp threads 11 and weft threads 10: the weft thread 10 alternately passes over, then under one warp thread 11, while the warp threads 11 pass over, then under two weft threads 10.

In such a configuration, it appears that at a transverse edge 8, on the left in FIG. 7, the reinforcement has an unweaving support 9, formed by weft threads 10 of the reinforcement 7, and in particular by the return of a weft thread 10 on either side of the warp threads 11 of the reinforcement 7, the return of the weft thread 10 surrounding the warp thread 11 of the associated transverse edge 8.

Because the warp threads 11 alternately pass over, then under two weft threads 10, the support 9 at the other transverse edge 8, on the right in FIG. 7, is formed by the filling 10 connected to itself: the latter forms a return or loop not surrounding the peripheral warp thread 11 located directly on the border, the loop closed by two rows of weft threads 10 interweaving the following loop of the other two rows of the weft thread 10 in the weaving direction.

Such a reinforcement 7 can for example be obtained during the manufacture of the reinforcement 7 by using a needle weaving loom such as a latch needle, the latter being visible in FIG. 7.

This unweaving support 9 is particularly suitable in the case of a relatively fine weft thread and in the case where an overthickness is not problematic. This is an unweaving support 9 which is easy to manufacture.

FIG. 8 illustrates a textile reinforcement 7 which essentially differs from the embodiment illustrated in FIG. 7 in that the support 9 at the other transverse edge 8, on the right in FIG. 8, is woven from an inlaid thread 12, different from the weft 10 and warp 11 threads of the reinforcement 7, the filler being connected by the inlaid thread 12.

Such an unweaving support is particularly suitable for preventing overthicknesses at the selvage along the transverse edge 8. Indeed, the inlaid thread, or catch thread, most often made from fine monofilament, yields a binding stitch which is barely visible. It is further suitable for the lowest tensile forces.

FIG. 9 illustrates another embodiment which essentially differs from the preceding embodiment in that the unweaving support 9 is not only woven from an inlaid thread 12, separate from the weft 10 and warp 11 threads of the reinforcement 7, but the weft thread 10 and the inlaid thread 12 are stitched together to form the unweaving support 9 which extends along the corresponding transverse edge 8 of the reinforcement 7.

Such an unweaving support 9 is particularly advantageous where the overthickness at the selvage is not important, but where the unweavability must be maximized, or where the weft thread can be caught in the stitch.

Figure 10:
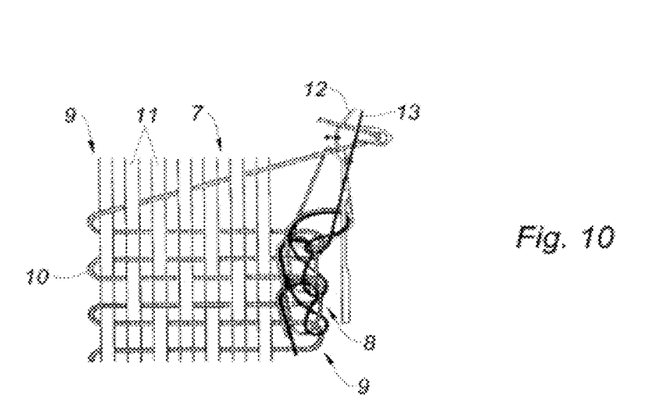

FIG. 10 illustrates another embodiment, the unweaving support 9 comprises an inlaid thread 12 similarly to the preceding embodiment, but with which the weft threads 10 are connected by stitching and the stitch of which is also further blocked by a blocking thread 13.

This unweaving support 9 is particularly interesting where the overthickness at the selvage must be avoided, while ensuring maximum unweavability. This support 9 also has the advantage of being formed independently of the weft thread.

Figure 11:
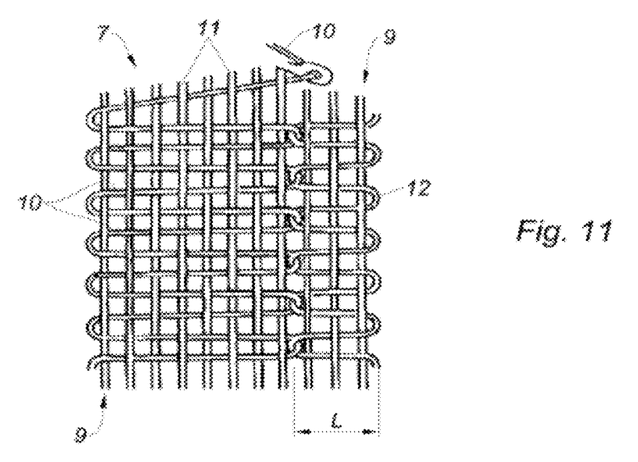

FIG. 11 illustrates a textile reinforcement 7 a textile reinforcement which essentially differs from the embodiment illustrated in FIG. 7 in that the support 9 at the other transverse edge 8, on the right in FIG. 11, is woven from an inlaid thread 12, different from the weft 10 and warp 11 threads of the reinforcement 7 and in that the unweaving support 9 is formed by an interweaving of warp threads 11 with the inlaid thread 12 connected to the weft thread.

In particular, the inlaid thread 12 completes the weft thread to form the stitching of the reinforcement over a bonding distance L of the inlaid thread 12 relative to the selvage, the inlaid thread 12 further being bonded to the weft thread.

Unlike the embodiment of FIG. 8, it is not only the filling which is bonded to the inlaid thread 12, but also the warp thread 11 over a predetermined distance relative to the selvage of the reinforcement 7.

More generally, and also as a function of the use of the conveyor belt and so as to adapt the reinforcement as a function of the tensile forces related to the application, the unweaving support 9 can be configured in different ways. For example, in other alternative or additional embodiments, the unweaving supports comprise a bonded and/or welded and/or sewn support, so as to form a seam 14 (for example serging), extending along the transverse edge 8 of the reinforcement 7.

Another alternative or additional example of unweaving support 9, may consist in a suitable treatment of the reinforcement at the transverse edge in question: this may be a chemical treatment, or the application of a support product by soaking which, after drying, makes it possible to support the transverse edges.

These types of unweaving supports are particularly interesting in the case where, for structural reasons, the warp threads are not positioned parallel to the transverse edges, as illustrated for example in the cutaway view 1B of FIG. 1.

To further improve their strength in this case, an inlaid thread 12 is added to sew the transverse edge itself so as to bind it, for example by surrounding said associated transverse edge in a spiral manner.

Figure 12:
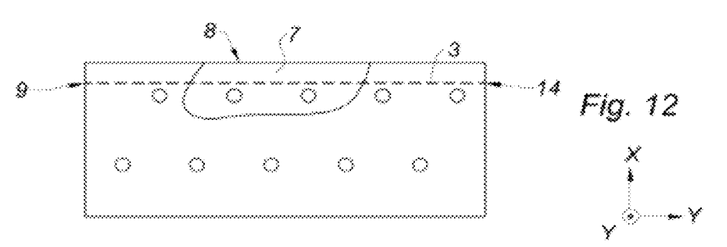

FIG. 12 illustrates a junction plate 4 made from a material surrounding the reinforcement 7, in which, along the transverse edge, a seam extends parallel to said transverse edge 8, between this edge and the adjacent row of the attachment means 5.

The invention is described above as an example. It is understood that the skilled person is able to produce different variant embodiments of the invention without departing from the scope of the invention.

For example, in light of the distances to transport various materials or various products according to the practices in quarries or other usage locations, a same conveyor belt or conveyor can be formed by the union or junction of several conveyor belts connected together by a junction device as described above.

Furthermore, it is understood that attachment means other than screws can be used while performing the same function.

Lastly, the term "transverse" connected to the edge of the reinforcement, or to the junction plate, must be understood as extending, once the junction device is assembled with the ends of the belt, from one side to the other of the conveyor belt while crossing it over its width. This does not limit the invention to an arrangement of the junction plates perpendicular to the conveyor belt, the junction device being perfectly able to have an angle different from 90° relative to the longitudinal axis.

The invention claimed is:

1. A junction device for a conveyor belt, intended for connecting two ends of at least one longitudinal conveyor belt, the junction device comprising at least two junction plates configured to each cover a separate side of the ends of the conveyor belt so that said conveyor belt is arranged between the two junction plates in an assembled operational position, the junction plates being secured together by attachment means arranged to pass through a junction plate, one of the ends of the conveyor belt and then the other junction plate, respectively, each of the junction plates being made of a flexible, resilient material and provided with a reinforcement, said reinforcement being formed by at least one textile layer comprising weft threads and warp threads, the junction device being characterized in that said reinforcement is delimited longitudinally by transverse edges, the reinforcement extending transversely relative to said conveyor belt in the assembled position, said transverse edges each having an unweaving support to prevent the unweaving of the reinforcement during the use of the junction device, the unweaving support being woven, and in that the unweaving support comprises at least one inlaid thread.

2. The junction device according to claim 1, wherein the unweaving support is formed by the inlaid thread binding the filling.

3. The junction device according to claim 1, wherein the weft thread and the inlaid thread are stitched together to form the unweaving support.

4. The junction device according to claim 1, wherein the inlaid thread and the weft threads are bound by stitching, the stitch further being blocked by a blocking thread.

5. The junction device according to claim 1, wherein the unweaving support is formed by an interweaving of warp threads with the inlaid thread bound to the weft thread.

* * * * *